United States Patent [19]
Cheng

[11] Patent Number: 6,113,057
[45] Date of Patent: Sep. 5, 2000

[54] SHOCK ABSORBING SEAT POST STRUCTURE FOR A BICYCLE

[75] Inventor: Tian-Chu Cheng, Shen Kang Hsiang, Taiwan

[73] Assignee: Kalloy Industrial Co., Ltd., Taichung Hsien, Taiwan

[21] Appl. No.: 09/356,906

[22] Filed: Jul. 20, 1999

[51] Int. Cl.[7] ................................................... F16M 13/00
[52] U.S. Cl. ............................................ 248/594; 280/283
[58] Field of Search .................................... 248/594, 598, 248/596, 597, 599, 600; 280/283

[56] References Cited

U.S. PATENT DOCUMENTS

| | | | |
|---|---|---|---|
| 4,934,724 | 6/1990 | Allsop et al. | 280/283 X |
| 5,024,413 | 6/1991 | Papp | 248/623 |
| 5,094,424 | 3/1992 | Hartway | 280/283 X |
| 5,529,326 | 6/1996 | Hwang | 280/283 X |

*Primary Examiner*—Ramon O. Ramirez
*Attorney, Agent, or Firm*—Rosenberg, Klein & Lee

[57] ABSTRACT

A shock absorbing seat post structure for a bicycle includes a seat post having a lug defining a pivot hole and an opening located under the pivot hole, a fixed rod mounted in the opening, a supporting base pivotally mounted to the lug and having a front end defining a first receiving space and a rear end pivotally mounted to the pivot hole and defining a second receiving space, a shoulder formed in the supporting base and defining a through hole, an adjusting rod having a front end passing through the through hole of the shoulder and a rear end mounted to the fixed rod, an annular shoulder mounted on the adjusting rod, and an elastic tube having a front end urged on the shoulder of the supporting base and a rear end urged on the annular shoulder of the adjusting rod.

6 Claims, 7 Drawing Sheets

SHOCK ABSORBING SEAT POST STRUCTURE FOR A BICYCLE

BACKGROUND OF THE INVENTION

1. Field of the Invention

The present invention relates to a shock absorbing seat post structure for a bicycle.

2. Description of the Related Prior Art

The seat post of a conventional bicycle is fixed to the seat thereof such that the inclination between the seat and the seat post is fixed and cannot be adjusted so that the bicycle is not applicable to riders of different statures, thereby limiting the utility of the bicycle. In addition, when an impact is applied on the bicycle, the force or pressure is directly transmitted from the seat post to the seat without a cushioning effect such that the rider will feel uncomfortably, and such that the connection between the seat post and the seat is easily broken.

SUMMARY OF THE INVENTION

The primary objective of the present invention is to provide a shock absorbing seat post structure for a bicycle comprising: a seat post including a lug formed on the top thereof, the lug defining a pivot hole and an opening located under the pivot hole; a fixed rod mounted in the opening; a supporting base pivotally mounted to the lug and having a front end defining a first receiving space and a rear end pivotally mounted to the pivot hole of the lug and defining a second receiving space, and a shoulder formed in the supporting base and defining a through hole located between the first receiving space and the second receiving space; an adjusting rod mounted in the support base and having a front end passing through the through hole of the shoulder and a rear end mounted to the fixed rod, and an annular shoulder mounted on the middle of the adjusting rod and received in the second receiving space of the supporting base; and an elastic tube mounted in the second receiving space of the supporting base and having a front end urged on the shoulder of the supporting base and a rear end urged on the annular shoulder of the adjusting rod.

Further objectives and advantages of the present invention will become apparent after a careful reading of the detailed description with reference to the accompanying drawings.

DETAILED DESCRIPTION OF THE PREFERRED EMBODIMENTS

Figure 1:
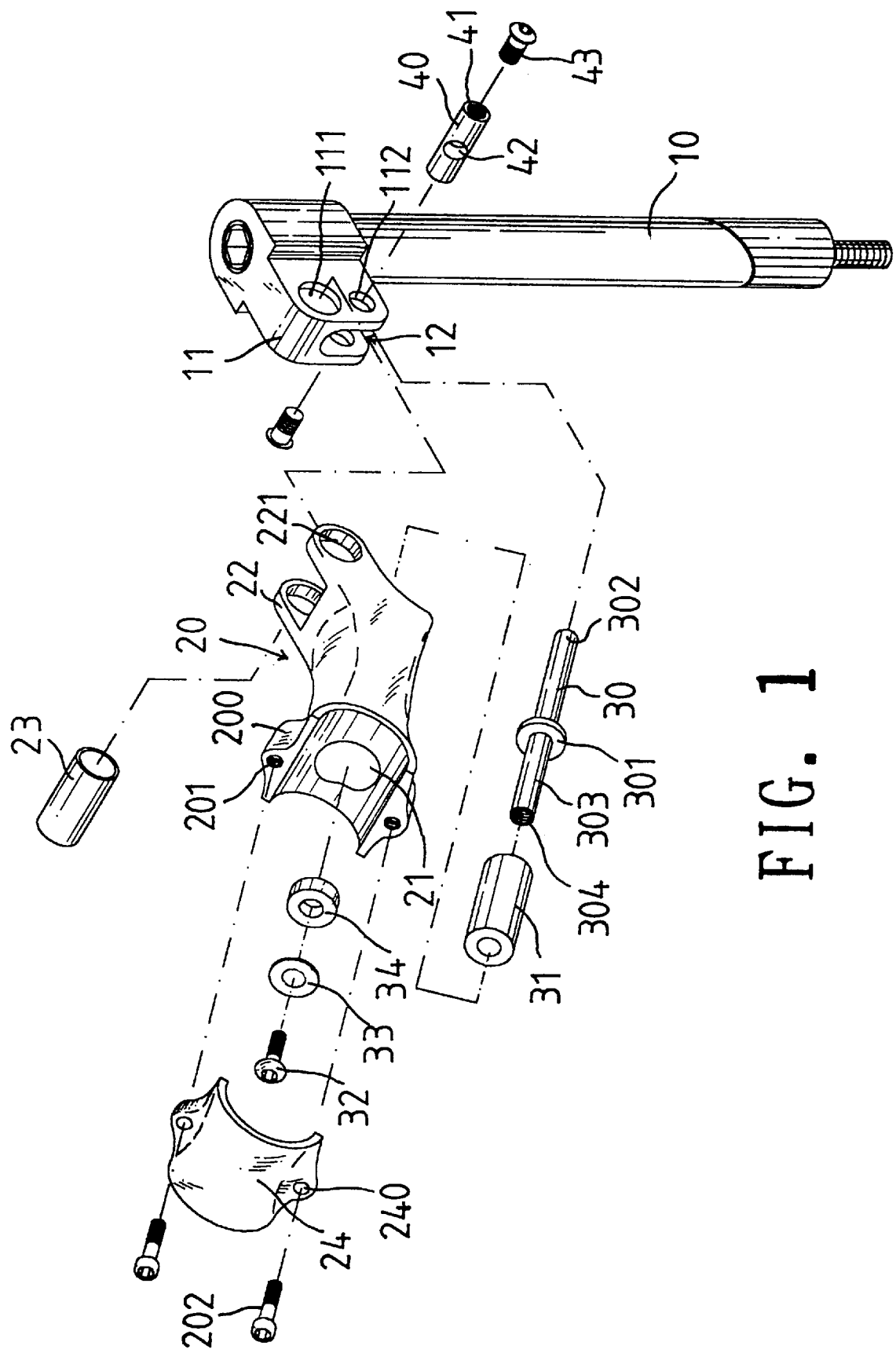
FIG. 1 is an exploded view of a shock absorbing seat post structure for a bicycle according to the present invention.
Figure 2:
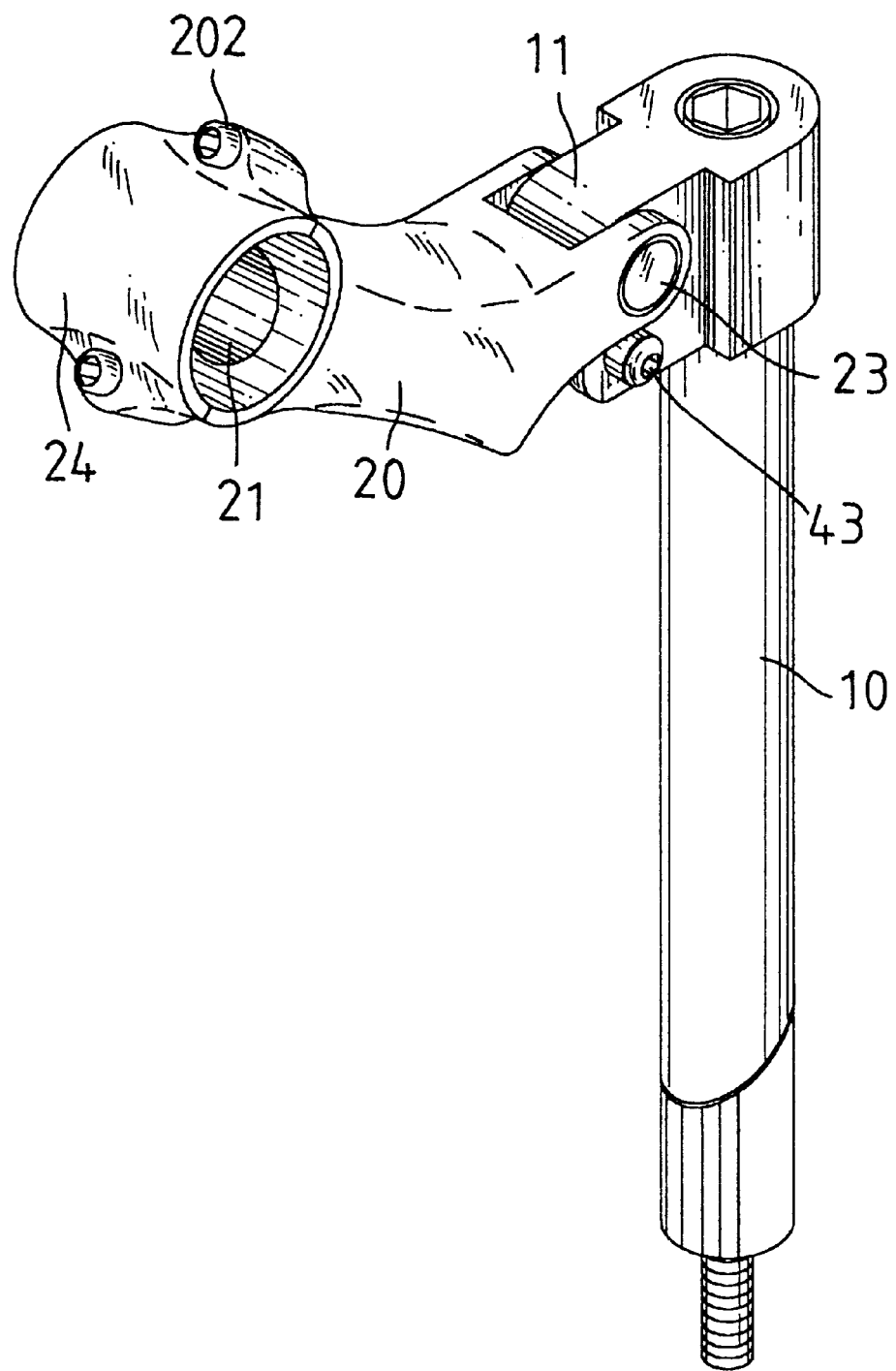
FIG. 2 is a perspective assembly view of the shock absorbing seat post structure as shown in FIG. 1.
Figure 3:
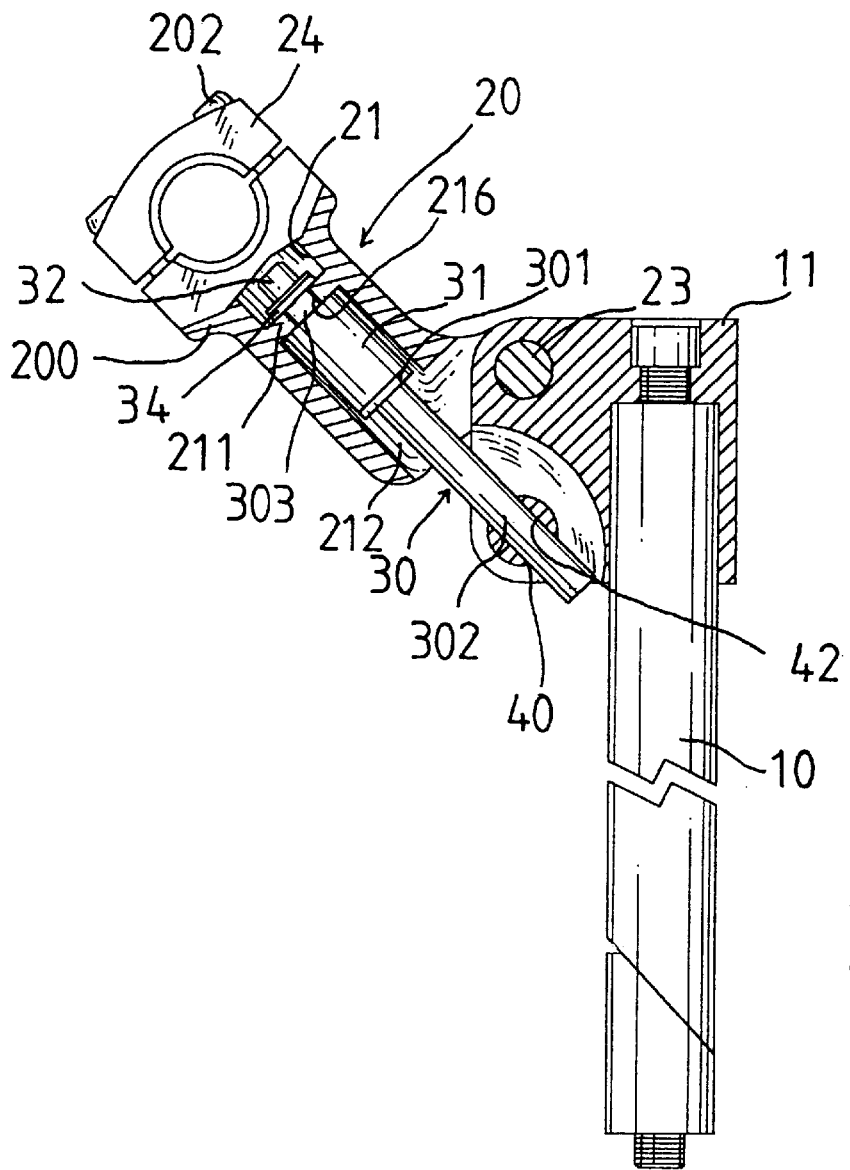
FIG. 3 is a front plan cross-sectional view of the shock absorbing seat post structure as shown in FIG. 2.

With reference to FIGS. 1–3, a shock absorbing seat post structure for a bicycle according to the present invention comprises a seat post 10 including a lug 11 formed on the top thereof, and defining a pivot hole 111 and an opening 12 located under the pivot hole 111, a fixed rod 40 mounted in the opening 12, a supporting base 20 pivotally mounted to the lug 11 and having a front end defining a first receiving space 21 and a rear end pivotally mounted to the pivot hole 111 of the lug 11 and defining a second receiving space 212, and a shoulder 211 formed in the supporting base 20 and defining a through hole 216 located between the first receiving space 21 and the second receiving space 212, an adjusting rod 30 mounted in the support base 20 and having a front end 303 passing through the through hole 216 of the shoulder 211 and a rear end 302 mounted to the fixed rod 40, and an annular shoulder 301 mounted on the middle of the adjusting rod 30 and received in the second receiving space 212 of the supporting base 20, and an elastic tube 31 mounted in the second receiving space 212 of the supporting base 20 and having a front end urged on the shoulder 211 of the supporting base 20 and a rear end urged on the annular shoulder 301 of the adjusting rod 30.

The rear end of the supporting base 20 is formed with two protruding ears 22 abutting the lug 11 each defining an axial hole 221 aligning with the pivot hole 111 of the lug 11, and the shock absorbing seat post structure comprises a pivot pin 23 passing through the axial hole 221 and the pivot hole 111 such that the supporting base 20 is pivoted to the lug 11. The lug 11 of the seat post 10 has two side walls each defining an axial hole 112 for receiving the fixed rod 40 therein, the fixed rod 40 has two ends each defining a screw hole 41 and a middle portion defining an insert hole 42 for receiving the rear end 302 of the adjusting rod 30 and communicating with the screw hole 41, and the shock absorbing seat post structure comprises two retaining screws 43 each screwed into the screw hole 41 and urged on the rear end 302 of the adjusting rod 30. The front end 303 of the adjusting rod 30 defines a screw hole 304 therein, and the shock absorbing seat post structure comprises a positioning screw 32 mounted in the first receiving space 21 and screwed into the screw hole 304 of the front end 303 of the adjusting rod 30, an elastic pad 34 mounted on the positioning screw 32 and urged on the shoulder 211 of the supporting base 20, and a washer 33 mounted between the positioning screw 32 and the elastic pad 34.

The front end of the supporting base 20 is formed with two lips 200 each defining a screw hole 201, and the shock absorbing seat post structure comprises a cover 24 mounted to the two lips 200 and defining two through holes 240 each aligning with the screw hole 201, and two positioning bolts 202 each passing through the through hole 240 of the cover 24 and each screwed into the screw hole 201 of the lip 200, thereby fixing the cover 24 to the two lips 200.

Figure 4:
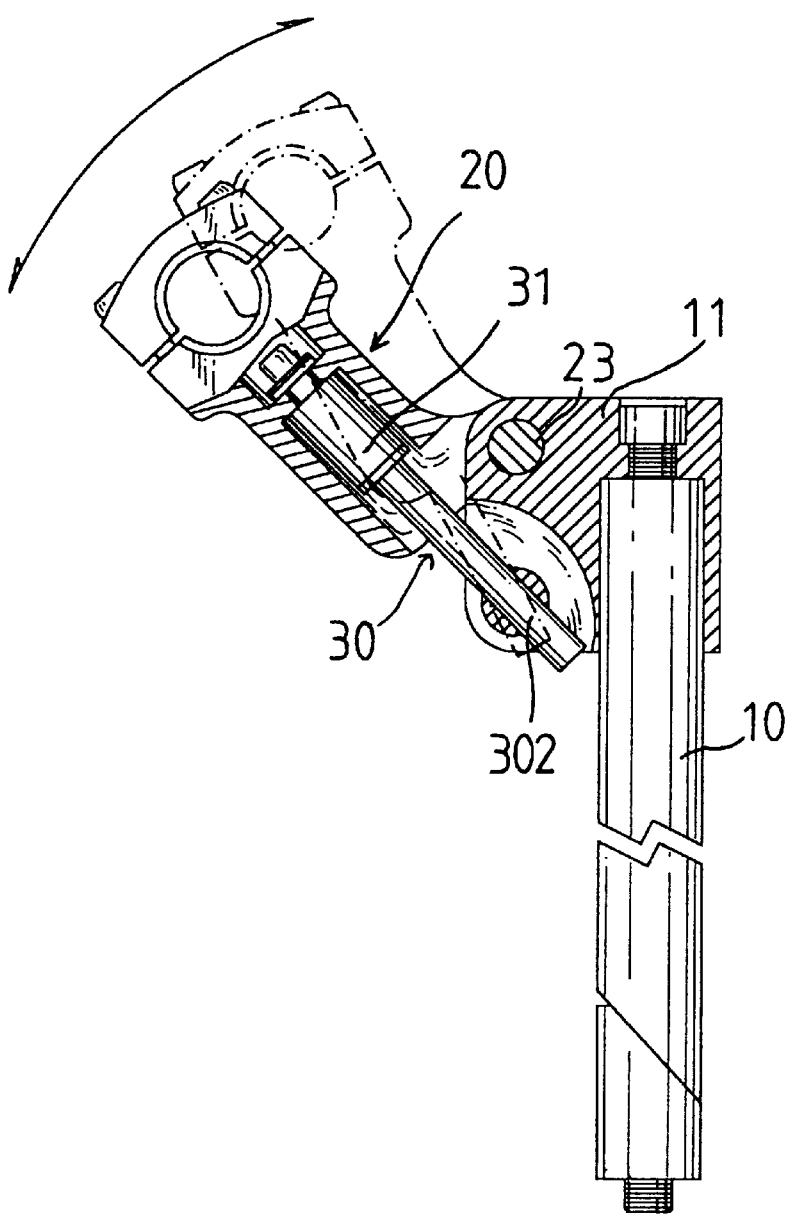
FIG. 4 is an operational view of the shock absorbing seat post structure as shown in FIG. 3.

As shown in FIG. 4, each of the two retaining screws 43 can be unscrewed from the screw hole 41, thereby detaching the rear end 302 of the adjusting rod 30 from the two retaining screws 43 such that the supporting base 20 can be pivoted about the pivot pin 23 relative to the lug 11 of the seat post 10, thereby optionally adjusting the inclined angle of the supporting base 20 relative to the seat post 10.

Figure 5:
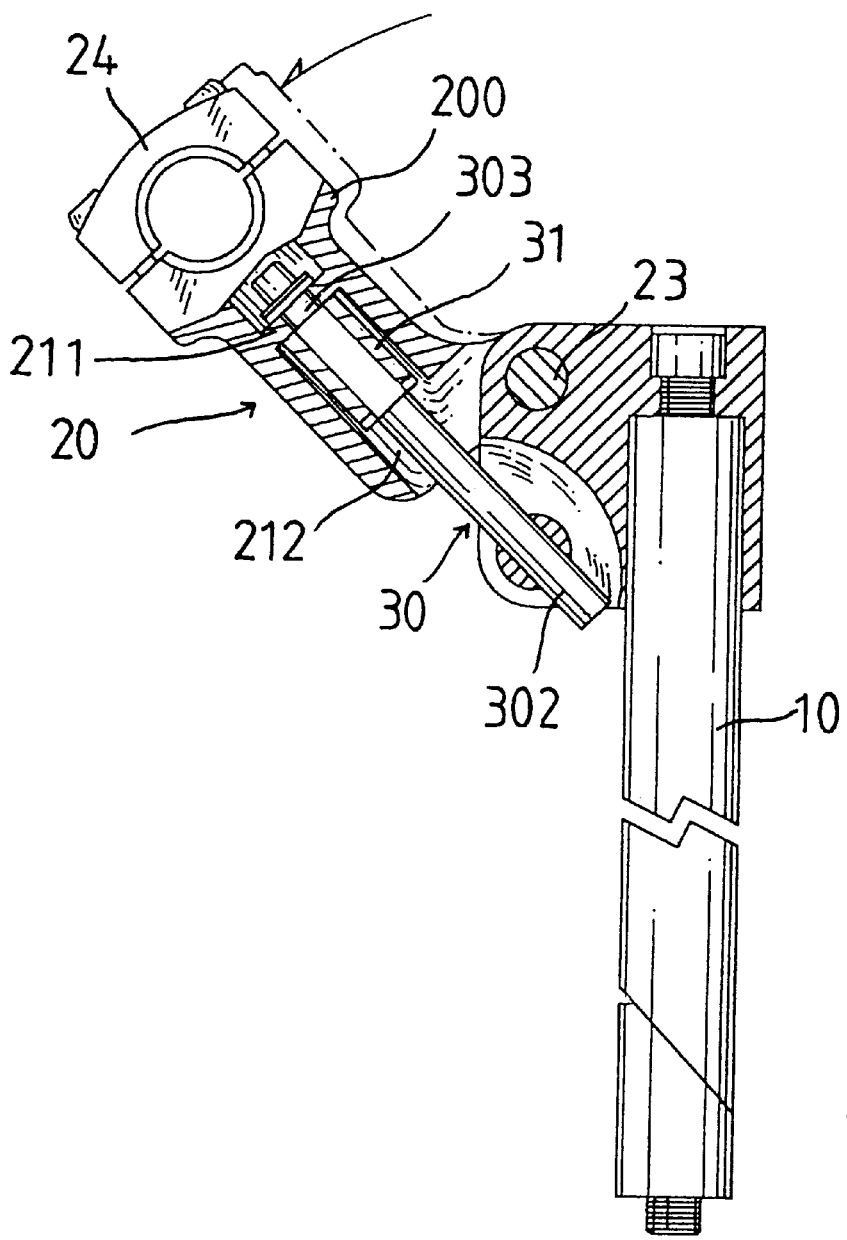
FIG. 5 is an operational view of the shock absorbing seat post structure as shown in FIG. 3.

As shown in FIG. 5, when the supporting base 20 is pressed downward due to a force being applied thereon, the inner wall of the supporting base 20 and the shoulder 211 will be moved to urge on the elastic tube 31 which is deformed so as to support the pressure exerted thereon, thereby efficiently achieving a shock absorbing or buffering effect to the supporting base 20.

Figure 6:
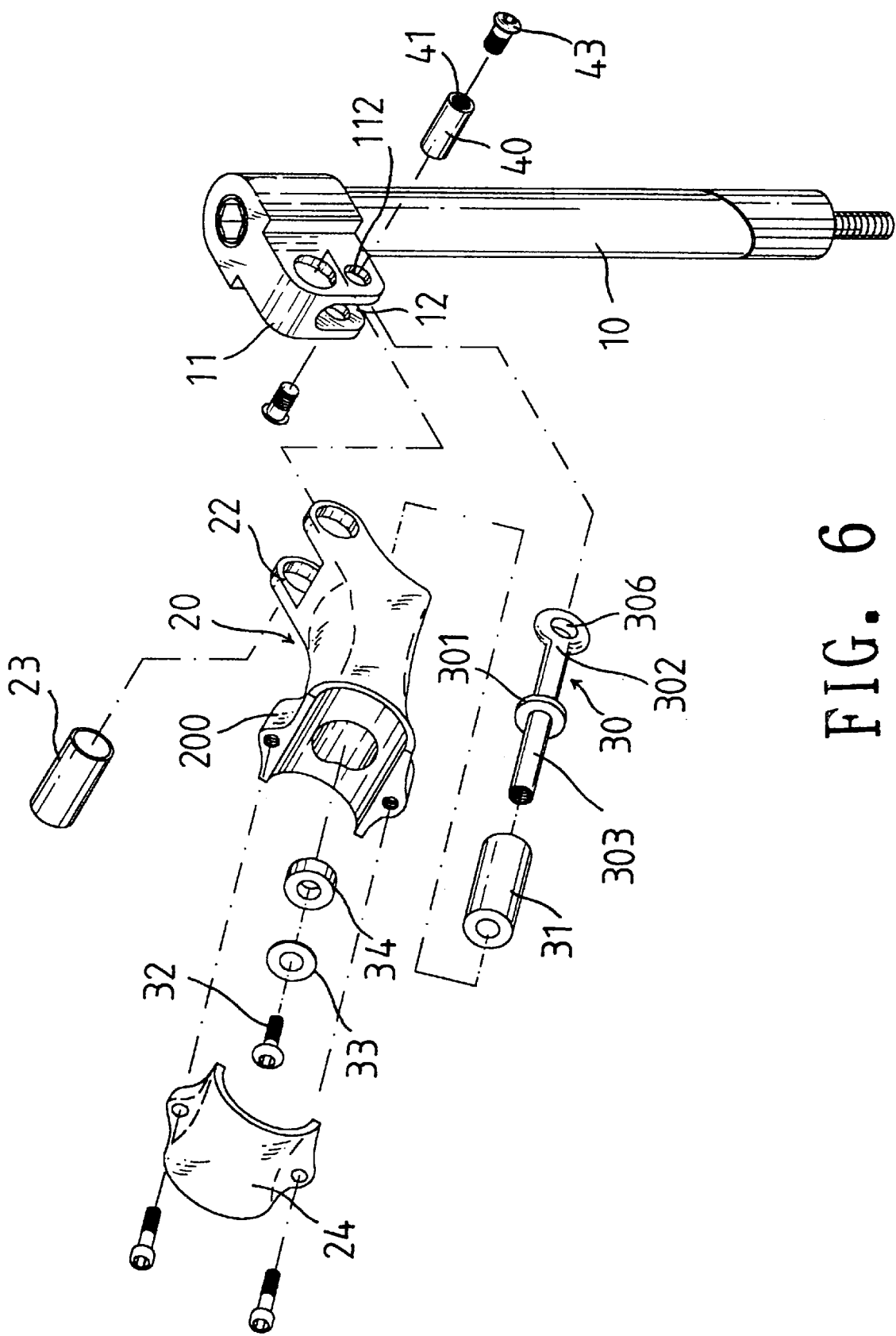
FIG. 6 is an exploded view of a shock absorbing seat post structure for a bicycle according to an alternative embodiment of the present invention.
Figure 7:
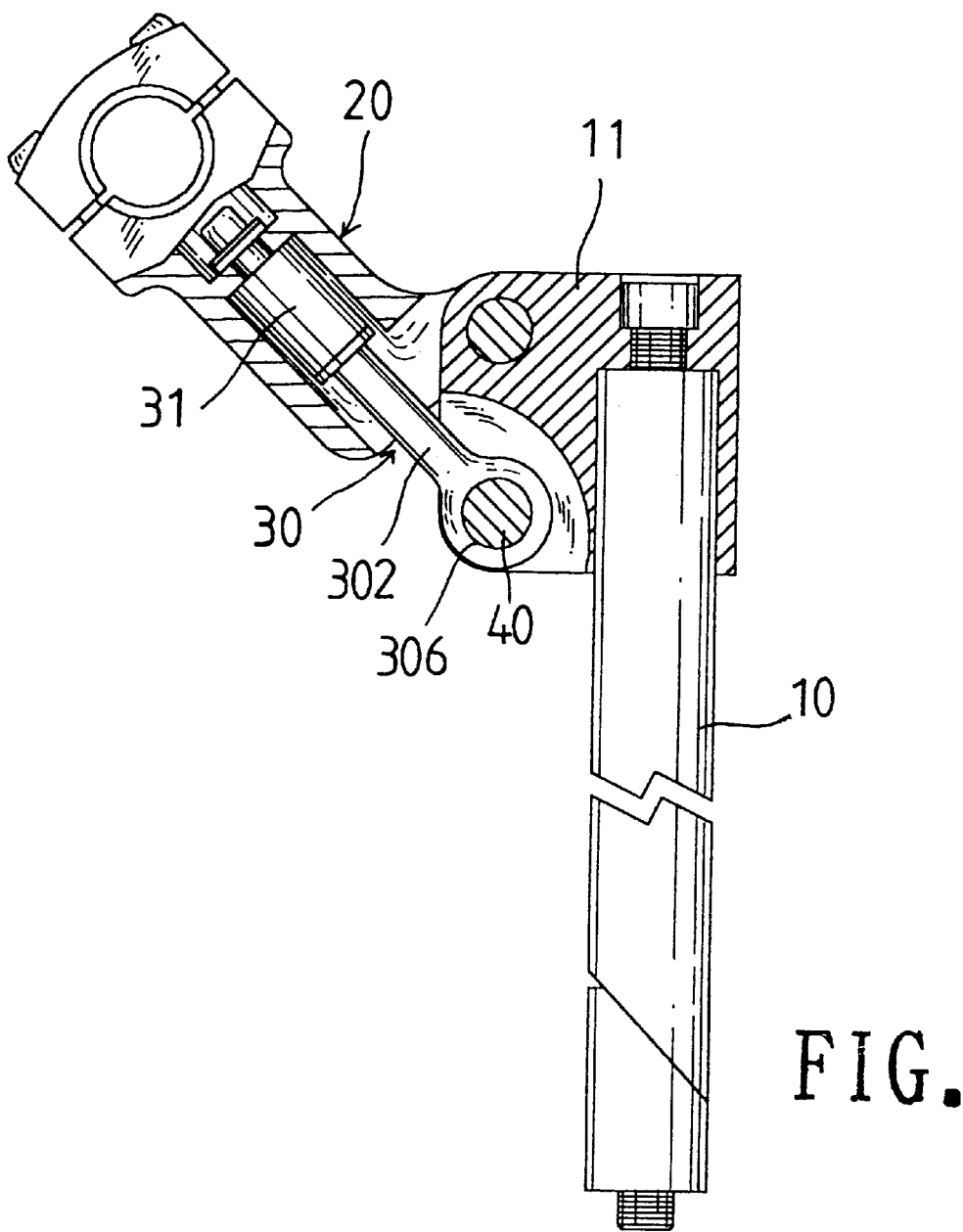
FIG. 7 is a front plan cross-sectional view of the shock absorbing seat post structure as shown in FIG. 6.

As shown in FIGS. 6 and 7, the insert hole 42 of the fixed rod 40 is removed, and the rear end 302 of the adjusting rod 30 defines a snapping hole 306 for receiving the fixed rod 40 therein.

Although the present invention has been described with a certain degree of particularity, it is to be understood that the present disclose has been made by way of example only and that many other possible modifications and variations can be made without departing from the scope of the present invention.

I claim:

1. A shock absorbing seat post structure for a bicycle comprising: a seat post including a lug formed on the top thereof, the lug defining a pivot hole and an opening located under the pivot hole; a fixed rod mounted in the opening; a supporting base pivotally mounted to the lug and having a front end defining a first receiving space and a rear end pivotally mounted to the pivot hole of the lug and defining a second receiving space, and a shoulder formed in the supporting base and defining a through hole located between the first receiving space and the second receiving space; an adjusting rod mounted in the support base and having a front end passing through the through hole of the shoulder and a rear end mounted to the fixed rod, and an annular shoulder mounted on the middle of the adjusting rod and received in the second receiving space of the supporting base; and an elastic tube mounted in the second receiving space of the supporting base and having a front end urged on the shoulder of the supporting base and a rear end urged on the annular shoulder of the adjusting rod.

2. The shock absorbing seat post structure as claimed in claim 1, wherein the rear end of the supporting base is formed with two protruding ears abutting the lug each defining an axial hole aligning with the pivot hole of the lug, and the shock absorbing seat post structure further comprises a pivot pin passing through the axial hole and the pivot hole such that the supporting base is pivoted to the lug.

3. The shock absorbing seat post structure as claimed in claim 1, wherein the lug of the seat post has two side walls each defining an axial hole for receiving the fixed rod therein, the fixed rod has two ends each defining a screw hole and a middle portion defining an insert hole for receiving the rear end of the adjusting rod therein and communicating with the screw hole, and the shock absorbing seat post structure further comprises two retaining screws each screwed into the screw hole and each urged on the rear end of the adjusting rod.

4. The shock absorbing seat post structure as claimed in claim 1, wherein the front end of the adjusting rod defines a screw hole therein, and the shock absorbing seat post structure further comprises a positioning screw mounted in the first receiving space and screwed into the screw hole of the front end of the adjusting rod, an elastic pad mounted on the positioning screw and urged on the shoulder of the supporting base, and a washer mounted between the positioning screw and the elastic pad.

5. The shock absorbing seat post structure as claimed in claim 1, wherein the front end of the supporting base is formed with two lips each defining a screw hole, and the shock absorbing seat post structure further comprises a cover mounted to the two lips and defining two through holes each aligning with the screw hole, and two positioning bolts each passing through the through hole of the cover and each screwed into the screw hole of the lip, thereby fixing the cover to the two lips.

6. The shock absorbing seat post structure as claimed in claim 1, wherein the lug of the seat post has two side walls each defining an axial hole communicating with the opening for receiving the fixed rod therein, the fixed rod has two ends each defining a screw hole, the rear end of the adjusting rod defines a snapping hole for receiving the fixed rod therein, and the shock absorbing seat post structure further comprises two screws each screwed into the screw hole and urged on the rear end of the adjusting rod.

* * * * *